United States Patent [19]

Berman et al.

[11] Patent Number: 5,550,930
[45] Date of Patent: Aug. 27, 1996

[54] METHOD AND SYSTEM FOR TRAINING A HANDWRITING RECOGNIZER AT THE TIME OF MISRECOGNITION

[75] Inventors: Eric R. Berman, Redmond; Luis F. T. Abdala; Marlin Eller, both of Seattle, all of Wash.

[73] Assignee: Microsoft Corporation, Redmond, Wash.

[21] Appl. No.: 42,834

[22] Filed: Apr. 5, 1993

Related U.S. Application Data

[63] Continuation of Ser. No. 716,730, Jun. 17, 1991, abandoned.

[51] Int. Cl.$^6$ .................................................... G06K 9/00
[52] U.S. Cl. ............................................. 382/187; 382/311
[58] Field of Search .................................. 382/13, 57, 54, 382/15, 40, 14, 187, 188, 189, 309, 310, 311, 159; 395/23; G06K 9/00, 9/62, 9/72, 9/40, 9/03

[56] References Cited

U.S. PATENT DOCUMENTS

| | | | |
|---|---|---|---|
| 4,727,588 | 2/1988 | Fox et al. | 382/57 |
| 4,914,709 | 4/1990 | Rudak | 382/57 |
| 4,972,496 | 11/1990 | Sklaren | 382/13 |
| 5,121,441 | 6/1992 | Chefalas et al. | 382/13 |
| 5,191,622 | 3/1993 | Shojima et al. | 382/13 |
| 5,267,327 | 11/1993 | Hirayama | 382/57 |

FOREIGN PATENT DOCUMENTS

| | | | |
|---|---|---|---|
| 2187882 | 7/1990 | Japan | 382/13 |

OTHER PUBLICATIONS

Sklarew et al "Handwritten Data Entry into a Computer", Linus Technologies, Inc. Jun. 1989.

*Primary Examiner*—Yon J. Couso
*Attorney, Agent, or Firm*—Seed and Berry

[57] ABSTRACT

A method and system for training a handwriting recognizer at the time of misrecognition is provided. In a preferred embodiment, a trainer program traps and stores the output from a recognizer. The output includes the recognized symbols mapped to the handwritten data. When training is requested by a user, the trainer displays the handwritten data that was input by the user and the recognized symbols. The user then selects the symbols to train on. In response to the selection, the trainer displays the portion of the handwritten data corresponding to the selected symbols. The user then enters the symbols that the displayed portion of the handwritten data should be recognized as. The trainer then requests the recognizer to train based on the displayed portion of the data and the entered symbols. When training is complete, the trainer requests re-recognition of the handwritten data and displays the newly recognized symbols.

21 Claims, 14 Drawing Sheets

METHOD AND SYSTEM FOR TRAINING A HANDWRITING RECOGNIZER AT THE TIME OF MISRECOGNITION

CROSS-REFERENCE TO RELATED APPLICATION

This application is a continuation of U.S. patent application Ser. No. 07/716,730, filed Jun. 17, 1991, now abandoned.

TECHNICAL FIELD

This invention relates to a method and system for training a handwriting recognizer and, in particular, for training a recognizer at the time of misrecognition.

BACKGROUND OF THE INVENTION

Handwriting recognition systems are being developed to allow users to input handwritten data into a computer. An electronic tablet allows a user to hand write data that the computer can recognize. The user writes data on the electronic tablet with a special pen. As the user moves the pen across the tablet, the tablet displays "ink." The tablet senses the position of the pen as the user writes and sends the position data to the computer. The computer receives this position data and converts it to recognized symbols, such as letters or numbers, in a convenient format, such as ASCII format. The computer then processes the formatted characters.

Some handwriting recognition systems recognize not only characters, letters and punctuation, but also gestures. Gestures are handwritten symbols that are typically used to represent editing commands or to produce non-printing text. For example, a handwritten backslash over a letter may mean delete the letter, a caret in between two letters may mean insert text, or a vertical line with an arrow to the left may mean insert a carriage return. Gestures are used extensively when printed documents are edited. During recognition, these gestures are converted to a convenient format for use by the computer.

These handwriting recognition systems use algorithms to map handwritten data to symbols. Typically, these systems internally store a prototype for each symbol that can be recognized. A prototype is a "picture" of a handwritten symbol that is used to map handwriting to a symbol. A system that recognizes just capital letters may have only 26 prototypes: one for each capital letter. Recognition systems use recognition algorithms to map handwritten data to a prototype. As long as the user writes like the prototypes, the handwritten data is successfully recognized. Conversely, the more dissimilar the handwritten data and the prototype are, the more likely it is that the handwritten data will be misrecognized. Misrecognition is typically due to the differences in user handwriting styles and legibility of the handwriting. For example, the handwritten word "dear" may be misrecognized as the word "clear" depending the way the user writes a "d" and the prototypes for the letters "d," "c," and "l."

A recognizer is that part of the recognition system that implements a recognition algorithm. Recognizers can be trainable or non-trainable. A non-trainable recognizer has a fixed set of prototypes (none can be added or modified). If a recognizer does not correctly recognize a user's handwriting, the non-trainable recognizer cannot be made to adapt to the user's handwriting. Rather, the user has to adapt to the prototype of the recognizer for recognition to occur. A trainable recognizer, on the other hand, allows the user to specify the handwritten data that corresponds to a symbol. For example, during training a recognizer may display a typewritten "A" and prompt the user to input a handwritten "A." The recognizer trains by modifying the prototype associated with the letter "A" or adding another prototype for the letter "A." Typically, a new user will have to train the recognizer before starting recognition. The recognizer may display each symbol that it can recognize and prompt the user to input the corresponding handwritten data. The user typically writes the handwritten data for each symbol within a rectangular field called a box. The recognizer then trains and is ready to recognize. While the user is writing to an application program, misrecognition may still occur. To train the recognizer on the misrecognized symbol, the user exits the application and invokes recognizer training. The user indicates which symbol the user wants to train on and hand writes the corresponding data in a box. The recognizer then trains and the user is free to go back to the application program and try again.

These training techniques are not satisfactory, however. First, training is done in a artificial environment. Users tend to write carefully and neatly when writing a single symbol in a box during training and tend to write carelessly and not neatly when writing words and sentences. Thus, the prototypes in the recognizer may not accurately represent the symbols that are written during data entry for an application program. Second, when the user goes to train on a misrecognized character, the user reenters the handwritten data that was misrecognized. The user may not do a very good job of rewriting this misrecognized data. Thus, the recognizer is trained on handwritten data that is different from the misrecognized data. Third, trainers typically require a one-to-one correspondence between a symbol and the handwritten data in a box. However, a user may use different writing styles for a letter depending on the context. For example, a user may write the letter "h" one way when it begins a word and another way when it follows the letter "t" When it follows a "t" the user may write the vertical part of the "t" and when crossing the "t" continue in the same stroke to make the letter "h." Thus, the "h" is a continuation of the cross in the letter "t." (A stroke refers to all the ink that is written starting with a pen down and ending with a pen up.) Fourth, the user interface for the trainer tends to be recognizer dependent. Thus, if a new recognizer is developed the user needs to learn the new user interface. Also, the expense of developing a recognizer includes the cost of developing a new trainer.

SUMMARY OF THE INVENTION

The present invention provides a method for training a handwriting recognizer at the time of misrecognition. In preferred embodiments, the trainer program is recognizer independent and application program independent. The trainer traps and stores the output from the recognizer. The output includes the recognized symbols mapped to the handwritten data. When training is requested by a user, the trainer displays the handwritten data that was input by the user and the recognized symbols. The user then selects the symbols to train on. In response to the selection, the trainer displays the portion of the handwritten data corresponding to the selected symbols. The user then enters the symbols that the displayed portion of the handwritten data should be recognized as. The trainer then requests the recognizer to train based on the displayed portion of the data and the entered symbols. When training is complete, the trainer requests re-recognition of the handwritten data and displays the newly recognized symbols.

It is an object of the present invention to provide a method and system for training a recognizer that uses the actual handwritten data that is misrecognized.

It is another object of the present invention to provide a method for displaying to the user the actual misrecognized handwritten data while training.

It is another object of the present invention to provide a method for displaying the misrecognized symbols.

It is another object of the present invention to provide a method for the user to select misrecognized symbols and to display the handwritten data corresponding to the misrecognized symbols out of context from the rest of the handwritten data.

It is another object of the present invention to provide a method for training wherein the user selects the handwritten data corresponding to one or more recognized symbols and this data is trained as one or more symbols.

It is another object of this present invention to provide a recognizer and application program independent trainer.

These and other objects will become apparent as the invention is more fully described below.

DETAILED DESCRIPTION OF THE INVENTION

Figure 1A:
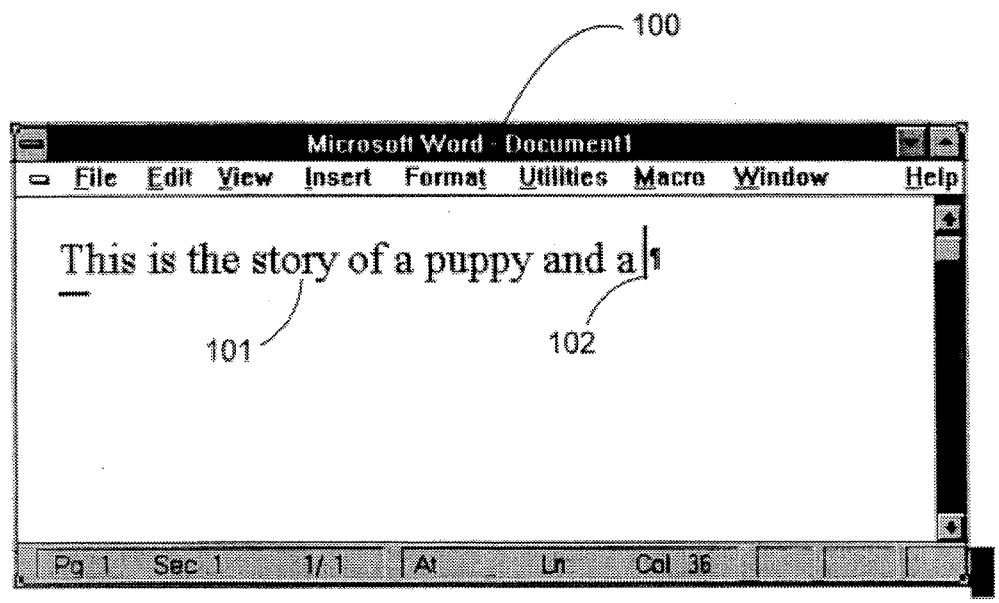
FIG. 1A shows a typical word processing window that accepts handwritten data.
Figure 1B:
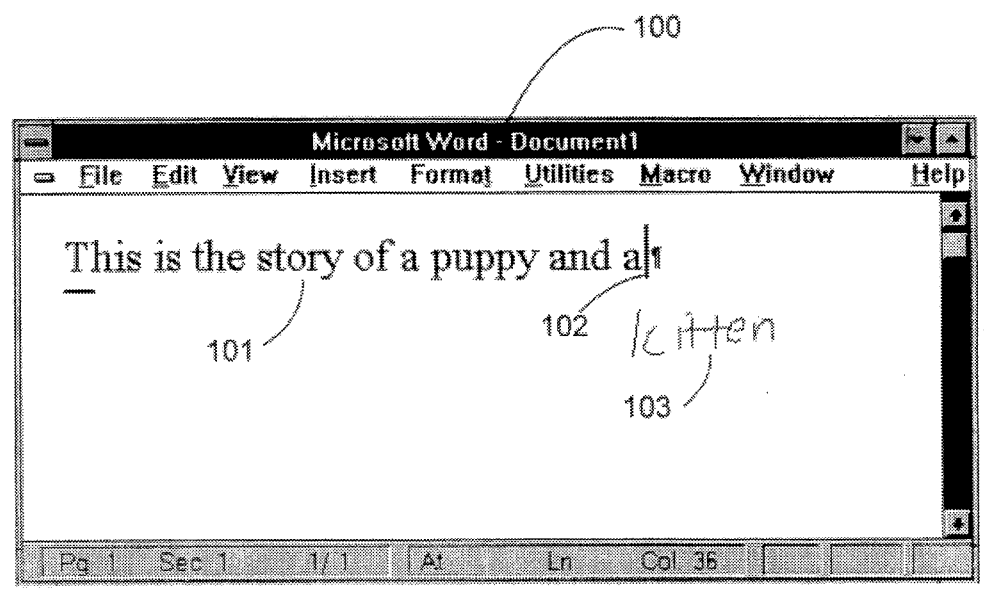
FIG. 1B shows the word processing window after handwritten data has been written.
Figure 1C:
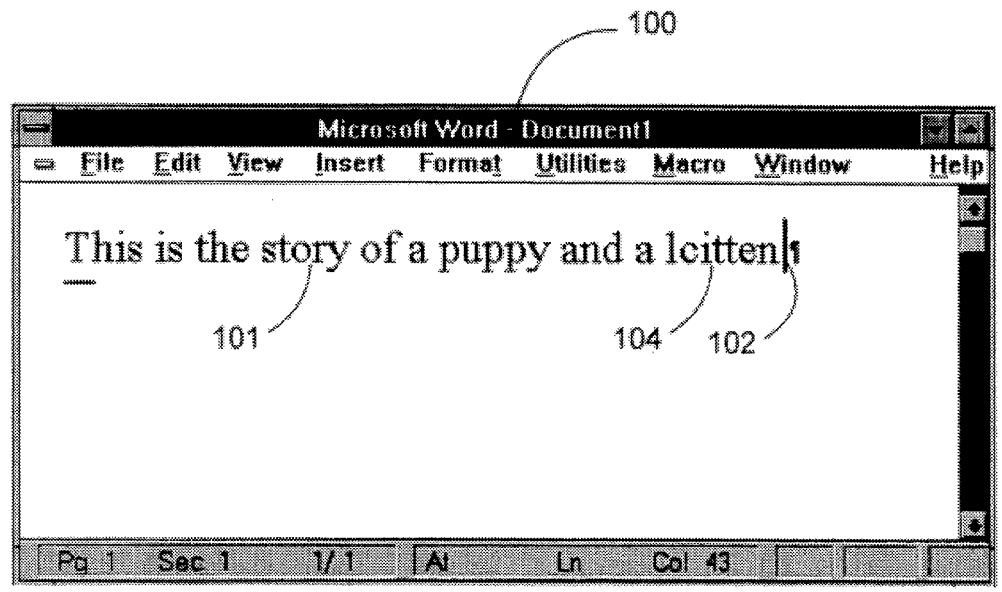
FIG. 1C shows the word processing window after the handwritten data has been converted to recognized symbols.
Figure 1D:
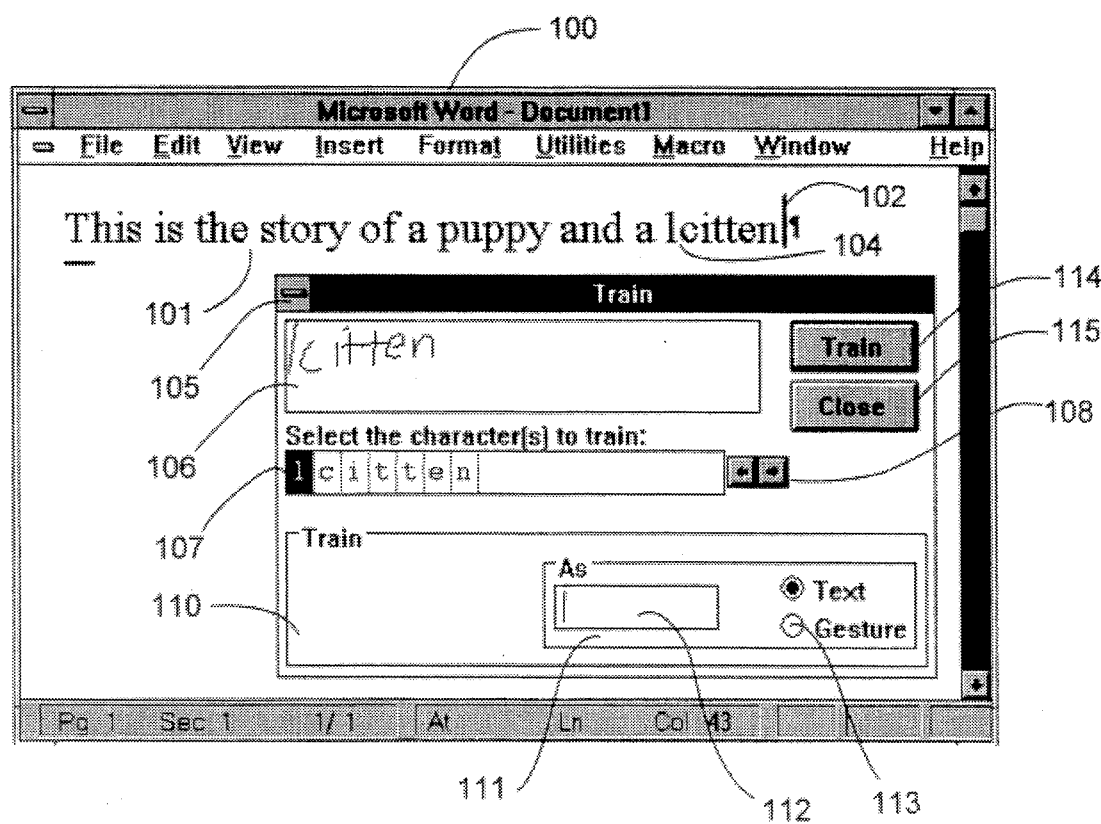
FIG. 1D shows the word processing window with an overlapping trainer window after the user selects training.
Figure 1E:
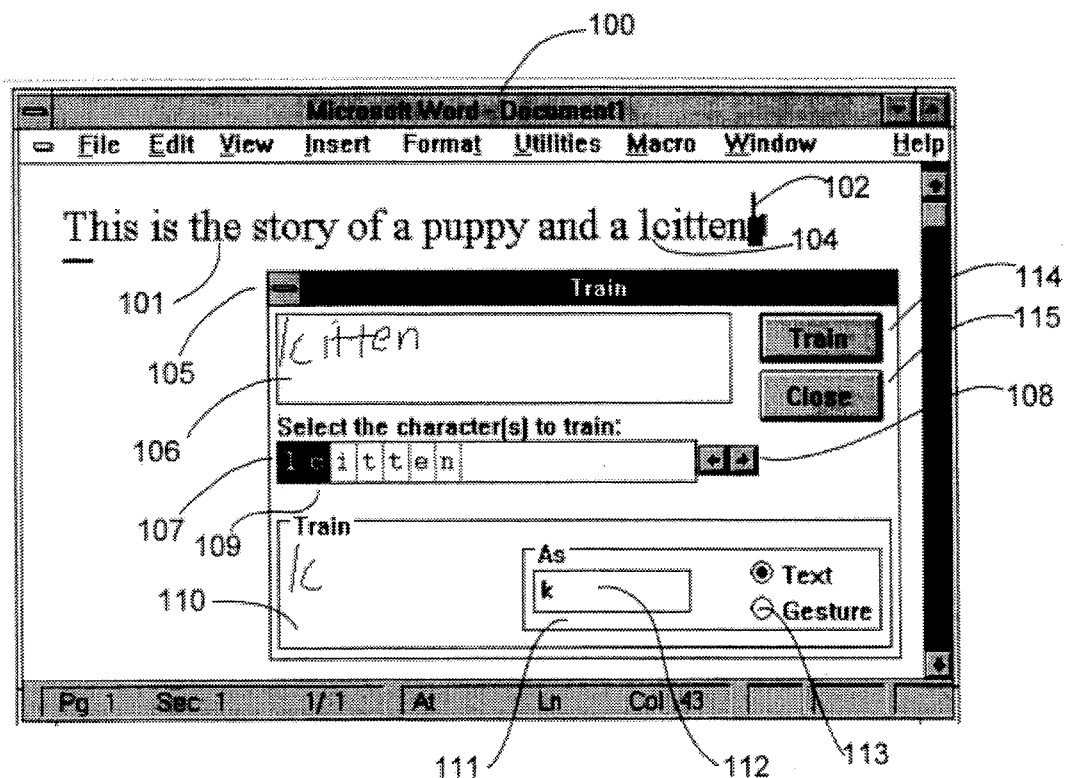
FIG. 1E shows the trainer window with misrecognized symbols selected by the user.
Figure 1F:
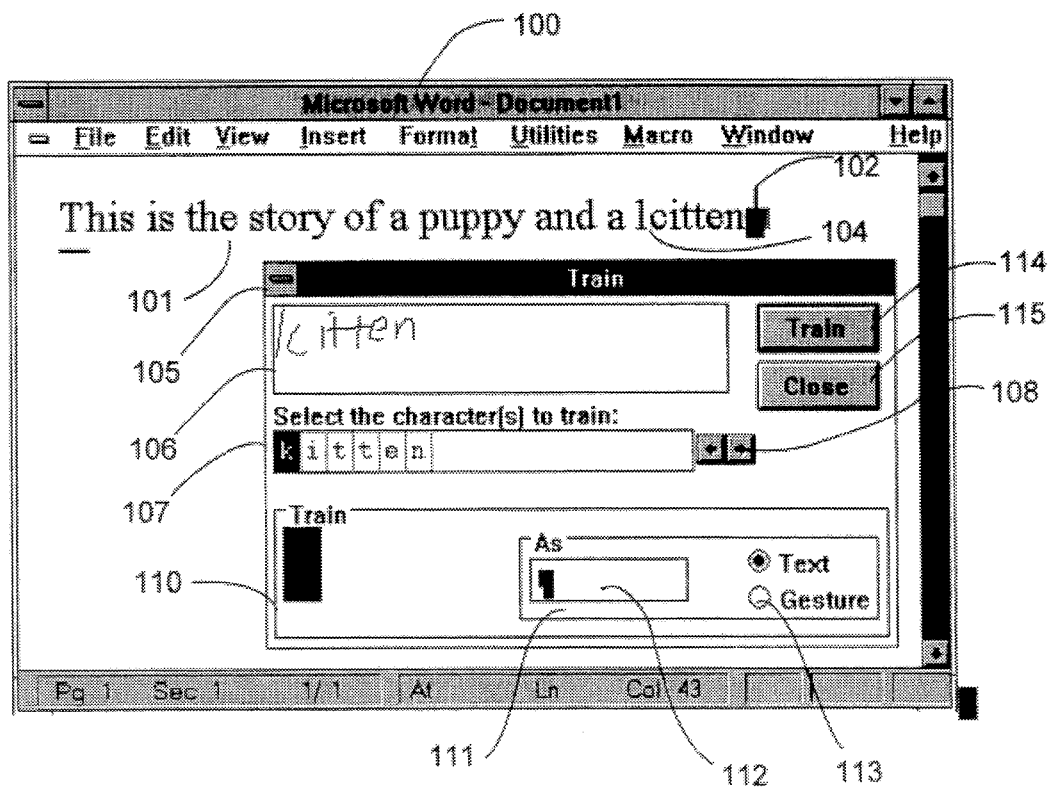
FIG. 1F shows the trainer window after training.

FIGS. 1A through 1F show a sample training session using the methods of the present invention. FIG. 1A shows a typical word processing window that accepts handwritten data. The window 100 contains a partial sentence 101 that has been entered. The insertion pointer 102 indicates where the next text data will be entered. FIG. 1B shows the word processing window after the handwritten data 103 has been written onto the window 100. FIG. 1C shows the window 100 after the handwritten data 103 has been converted to recognized symbols. The result of the recognition was inserted into the word processing document as "lcitten" 104. In this example, the handwritten data 103 was misrecognized. The "k" in kitten was recognized as an "lc." At this point the user can select to train the recognizer to the correct interpretation of the user's handwritten "k." FIG. 1D shows the window 100 with an overlapping train window 105 after the user selects training. The train window 105 contains an ink box 106, character boxes 107, scroll arrows 108, train box 110, train button 114, and close button 115. The ink box 106 contains the handwritten data 103 that the user wrote on the window 100 as shown in FIG. 1B. The character boxes 107 contain the recognized symbols for the handwritten data displayed in the ink box 106. If there are more recognized symbols than can be displayed at once in the character boxes 107, the scroll arrows 108 allow the user to scroll the recognized symbols left or right into view. The ink box 106 scrolls in tandem with the character boxes 107 to insure that the handwritten data which is displayed corresponds to the recognized symbols that are visible in the character boxes 107. FIG. 1E shows the selection of the misrecognized symbols 109 by the user. The user selects the misrecognized symbols 109 by tapping (pen down and pen up) the pen on the corresponding character boxes. The misrecognized symbols 109 are highlighted. The user can select multiple character boxes by dragging the pen across the boxes. The character boxes automatically scroll during the dragging process when the pen is dragged across the right-most or left-most visible symbol. When the misrecognized symbols are selected, the trainer displays in the ink train box 110 the handwritten data that corresponds to the selected symbols 109. Correctly recognized symbols can also be selected. In a preferred embodiment, the trainer also highlights the handwritten data in the ink box that corresponds to the selected symbols. This highlighting can be done by making the corresponding strokes thicker or using reverse video. In an alternate preferred embodiment, the user can select symbols by tapping near strokes in the ink box. The trainer selects the recognized symbol that encompasses that stroke and highlights the symbol in the character boxes. In this example, if the user tapped near the cross on the "t" the entire "t" would be highlighted. The user can also select multiple symbols by circling the corresponding data in the ink box. The display in the train box of the handwritten data corresponding to the misrecognized symbols allows the user to view the misrecognized symbols out of context with the rest of the handwritten data. This out-of-context viewing facilitates the determination of whether the misrecognition was the fault of sloppy handwriting or the fault of the recognizer. The as box 111 allows the user to input data to train the recognizer. The as box 111 contains correction box 112 and radio buttons 113. The user enters the symbols into the correction box 112 corresponding to the handwritten data in the train box 110. The user could enter the symbols through a keyboard, a virtual keyboard displayed on the screen, or through handwriting. The radio buttons 113 indicate whether the train box 110 contains text symbols or a gesture. After the user fills in the as box 111, the user selects the train button 114 to train the recognizer. FIG. 1F shows the train window 105 after training. In a preferred embodiment, the trainer sends a message to the window 100 telling it to replace the misrecognized symbols with the correct symbols. Also, if there were multiple recognition problems the user would have a chance to correct the other problems. When the user completes training, the user selects the close button 115 and control returns to the window 100.

Figure 2A:
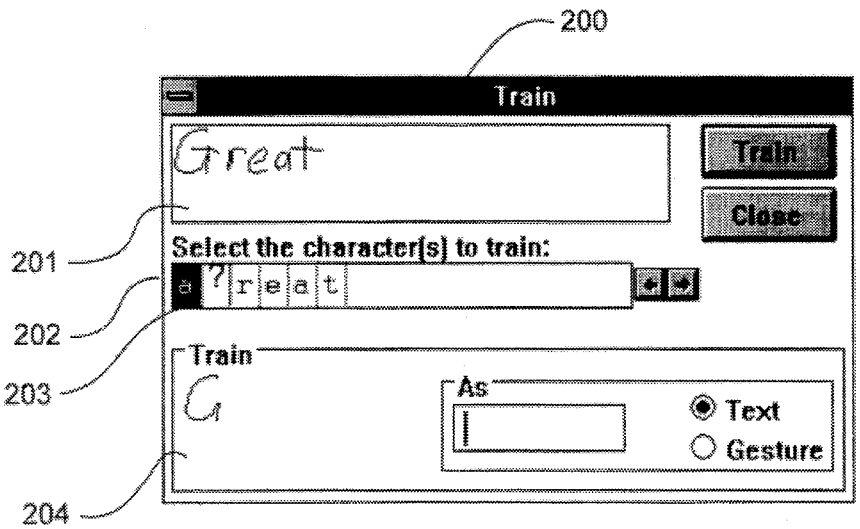
FIGS. 2A and 2B show a trainer window when the letter "G" in the handwritten word "Great" is misrecognized and corrected.
Figure 2B:
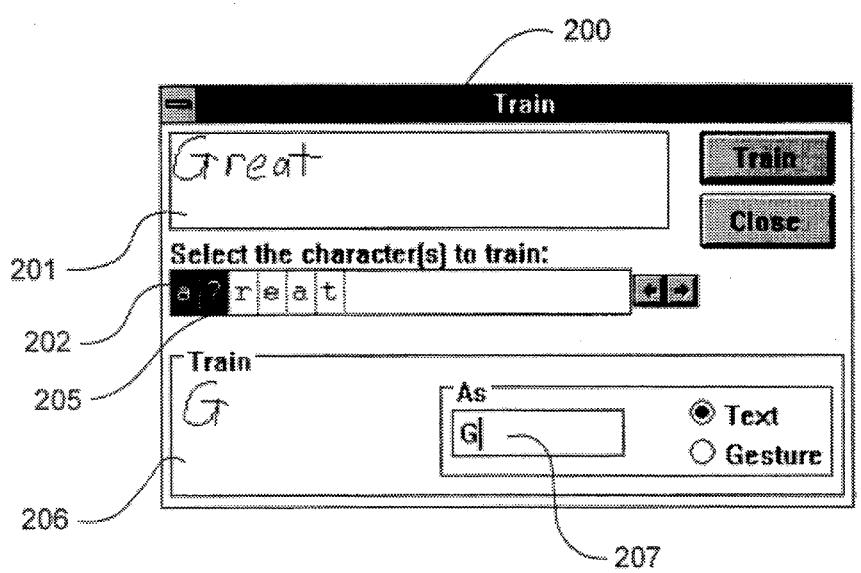

FIGS. 2A and 2B show a trainer window when the letter "G" in the handwritten word "Great" is misrecognized and corrected. FIG. 2A shows the handwritten data for the word "Great" in the ink box 201. The character boxes 202 contain the recognized symbols corresponding to the data in the ink box 201. The recognized symbols are "A?reat." The question mark indicates that the recognizer did not recognize corresponding handwritten data. The character "A" 203 is highlighted to indicate user selection. The train box 204 contains the handwritten data corresponding to the selected character "A." The recognizer recognized part of the "G" as a capital "A." FIG. 2B shows the handwritten data corresponding to the "A" and the unrecognized symbol. The train box 206 shows the handwritten data for the "G." The correction box 207 shows that the user entered a "G" as the correct recognition for the handwritten "G."

The methods of the present invention allow the user considerable flexibility in training the recognizer. In the above examples, a single handwritten character was recognized as two characters. The methods also support training when multiple handwritten characters are recognized as a single character. For example, if the "lc" in "calces" is recognized as the "k" in "cakes," the user can then select the "k" in the character boxes and enter the "lc" in the correction box for training. Similarly, the methods support training when multiple characters are incorrectly recognized as another group of multiple characters. For example, if the handwritten word "and" is misrecognized as the word "cued," the user can select all four characters in the character boxes—"cued"—and enter "and" into the correction box for training. The methods also support context training. For example, if the handwritten characters "and" are misrecognized as "aud," the user may decide that the handwritten "n" when taken out of context could be a "u" or an "n." However, the user knows that when the handwritten "n" is within the context of the word "and" it should always be recognized as an "n." The methods allow the user to select the "aud" in the character boxes. The methods then display the handwritten "and" in the train box. The user enters "and" in the correction box. Thus, the recognizer is trained to recognize the handwritten "and" as the word "and" without recognition of the individual characters.

Figure 3:
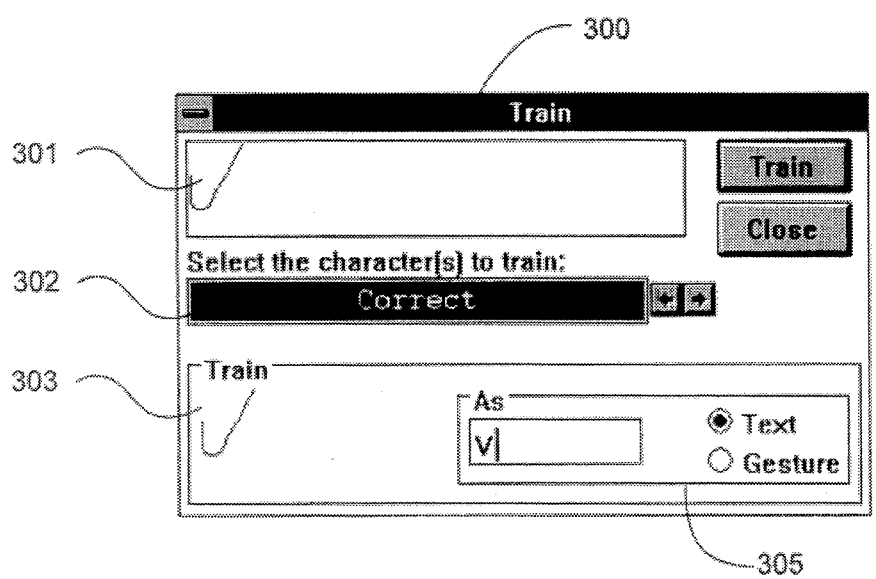
FIG. 3 shows the trainer window with a letter misrecognized as a gesture.

The methods also support training with gestures. FIG. 3 shows a character that is misrecognized as a gesture. The train box 300 shows the training when the handwritten character "V" is misrecognized as the "correct" gesture. The ink box 301 contains the handwritten data for the letter "V." The character boxes 302 contain an indication that the handwritten data is recognized as the "correct" gesture. The as box 305 shows that the user entered a "V" as the correct recognition of the handwritten data.

Figure 4:
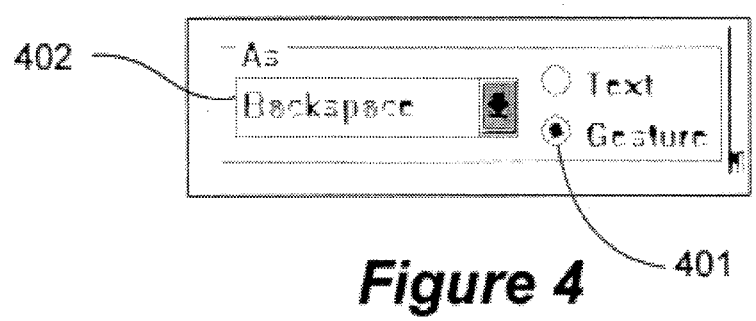
FIG. 4 shows the "As" box of the trainer window when the handwritten data is corrected to the backspace gesture.

The methods of the present invention also support training when a gesture is misrecognized as a character. FIG. 4 shows the as box for the train window when the handwritten data is corrected to the backspace gesture. When the gesture radio button 401 is selected, the correction box 402 displays a combo box with a list of gestures. The methods of the present invention allow for any handwritten data, whether recognized as a gesture or text, to be trained as a gesture or text.

Figure 5:
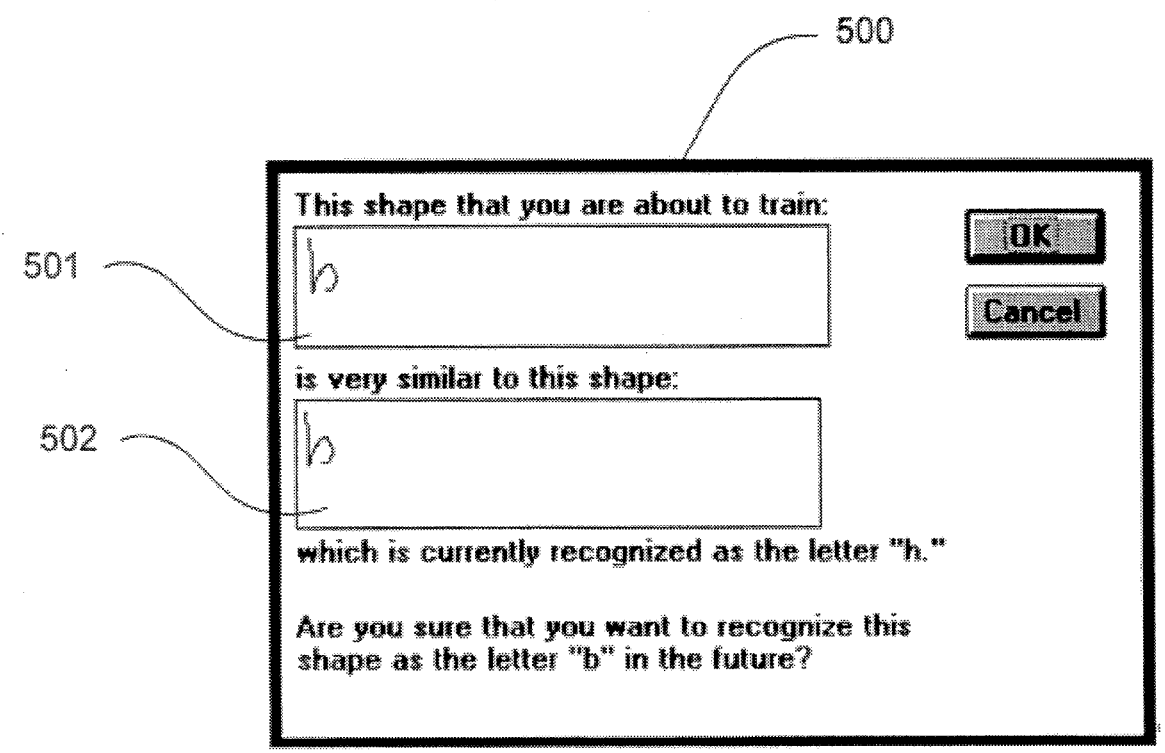
FIG. 5 shows a window displayed by the recognizer when the recognizer verifies a training request.

FIG. 5 shows a window displayed by a recognizer when the recognizer verifies a training request. In a preferred embodiment, the recognizer detects that the handwritten data that is about to be trained on is very similar to an existing prototype. The recognizer displays the window 500 to verify whether training should proceed. In display field 501, the recognizer displays the handwritten data to train on. In display field 502, the recognizer displays the ink for the similar prototype. The recognizer prompts the user for verification to proceed with the training. This verification provides a check to ensure that the user does not train on handwritten data as one character when is should normally be recognized as a different character. In an alternate embodiment, this window can be controlled by the trainer when the recognizer returns the verification request to the trainer.

Figure 6:
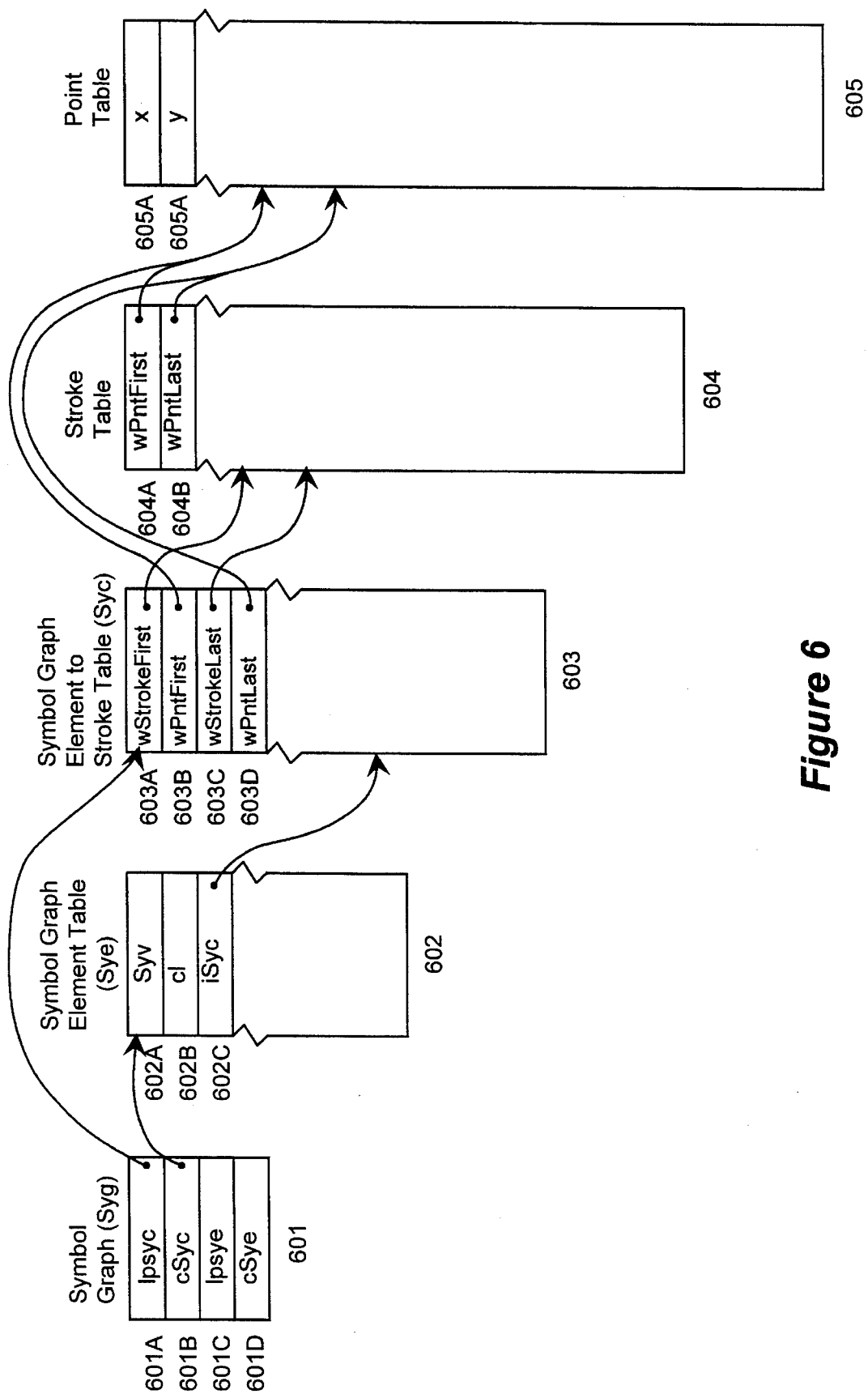
FIG. 6 shows the data structure layout for the data returned by the recognizer.

FIG. 6 shows the data structure layout the data returned by the recognizer. The recognizer returns a symbol graph. A symbol graph is a representation of possible interpretations identified by the recognizer. For example, a recognizer may interpret the handwritten word "dear" as either "dear" or "clear." The symbol graph can be represented by the following syntax:

{d|cl}ear

The "|" symbol indicates that the handwritten "d" may be a "d" or a "cl." In a preferred embodiment, a symbol graph is represented by the data structure Symbol Graph 601. The Symbol Graph 601 contains pointer lpsyc 601A, which points to the Symbol Graph Element To Stroke Table 603, count csyc 601B, which holds the count of entries in the Element To Stroke Table 603, pointer lpse 601C, which points to the Symbol Graph Element Table 602, and count csye 601D, which holds the count of the entries in the Element Table 602. The Element Table 602 contains an entry for each element in the symbol graph. The element table corresponding to the symbol graph "{d|cl}ear" has nine entries, one for each element. The Element Table 602 contains identifier Syv 602A, which identifies the element type (e.g. "{" or "e"), identifier cl 602B, which indicates the confidence the recognizer has in the recognition of the element, and index iSyc 602C, which is an index into the Element To Stroke Table 603 to the first stroke that corresponds to the element. The recognizer may give a confidence level of 0.9 for the "d" and 0.7 for the "cl" to indicate that the handwritten data is more likely "dear." The Element To Stroke Table 603 contains a mapping of the elements to the strokes that comprise the symbols for the symbol graph. Each entry in the Element To Stroke Table 603 contains index wStrokeFirst 603A, which points to the entry in the Stroke Table 604 that is the first stroke in the element, index wPntFirst 603B, which points to the entry in the Point Table 605 that is the first point in the first stroke, index wStrokeLast 603C, which points to the entry in the Stroke Table 604 that is the last stroke in the element, and index wPntLast 603D, which points to the entry in the Point Table 605 that is the first point in the last stroke. The Stroke Table 604 contains an entry for each stroke in the symbol graph. Each entry contains index wPntFirst 604A, which points to the entry in the Point Table 605 that is the first point in the stroke, and index wPntLast 604B, which points to the entry in the Point Table 605 that is the last point in the stroke. The Point Table 605 contains an entry for each point that comprises the strokes. Each entry contains the x 605A and y 605B coordinates for a point.

Figure 7:
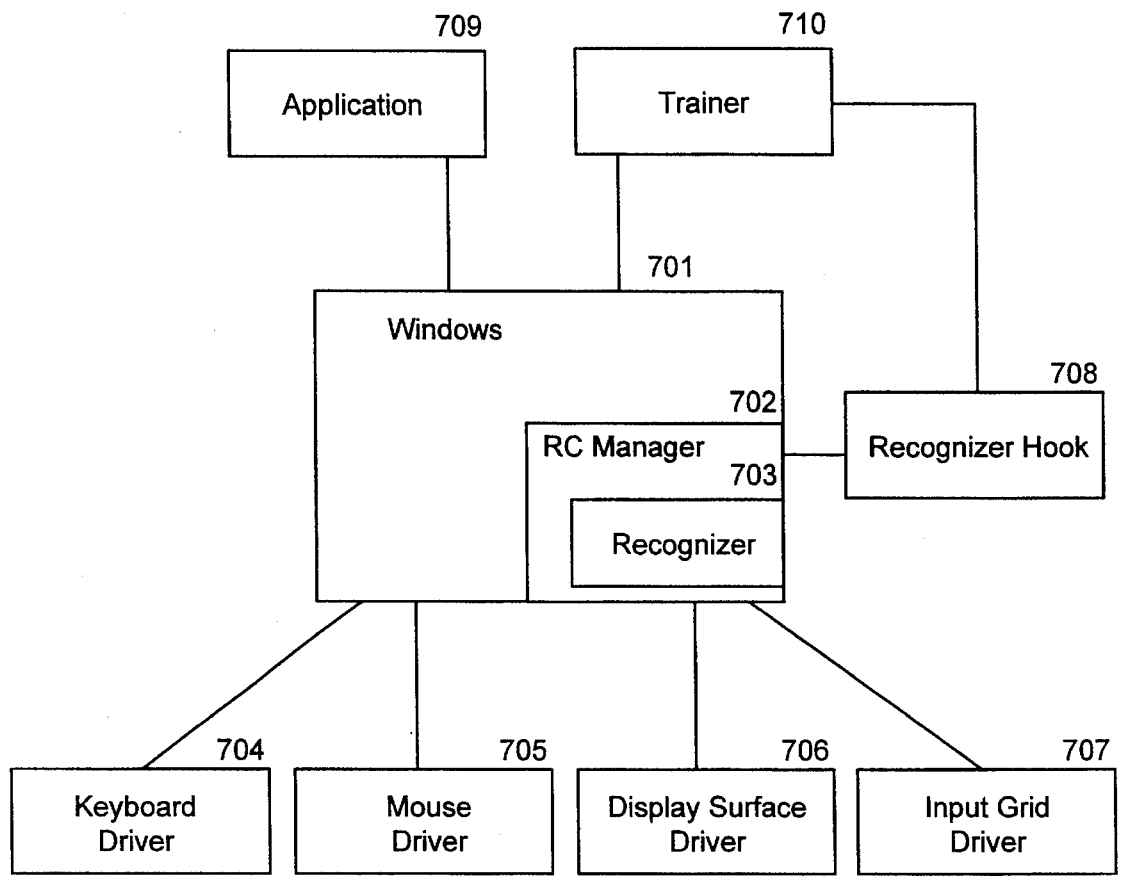
FIG. 7 shows components of a preferred embodiment of the present invention.

FIG. 7 shows the components of a preferred embodiment of the present invention. Application 709 operates in a windowing environment supported by Windows 701. However, one skilled in the art would recognize that the methods of the present invention can be practiced in other windowing and non-windowing environments. A description of the handwriting aspects of Windows is contained in "Microsoft Windows Graphical Environment for Pen Computing SDK—Guide to Programming" manual (Appendix A). Windows 701 contains a recognition context (RC) manager 702 that support handwriting data entry and recognition. The RC manager 702 includes a recognizer 703, which receives raw handwritten data and converts the data to recognized symbols. Application programs requesting recognition of handwritten data receive recognized symbols upon completion of the recognition. Windows 701 has a standard keyboard driver 704 and a standard mouse driver 705. The display surface driver 706 controls the inking of data on a display. The input grid driver 707 controls the input of handwritten data from a tablet. The recognizer hook 708 traps all output from recognizer. The recognizer hook 708 sends the trapped output to the trainer 710. The trainer 710 controls training. In operation, a user writes data onto the input tablet that is intended as input for the application 709. The input grid driver 707 receives that data and sends it to the RC manager 702. The RC manager 702 inks the data on the tablet by sending output data to the display surface driver 706. The display surface driver 706 sends the data to the display. When the RC manager 702 detects that the user has finished writing, it sends the raw handwritten data to the recognizer 703. The recognizer 703 returns the recognized symbols, formatted as a symbol graph, to the RC manager 702. The RC manager 702 invokes the recognizer hook 708. The recognizer hook sends the symbol graph information to the trainer 710. The RC manager 702 also sends the recognized symbols to the application 709. The application 709 would typically display the symbols as printed characters or perform the function indicated by gestures. When a user wants to train, the user selects a training mode in the trainer 710. Training then proceeds as illustrated in FIGS. 1A through 1F.

Figure 8:
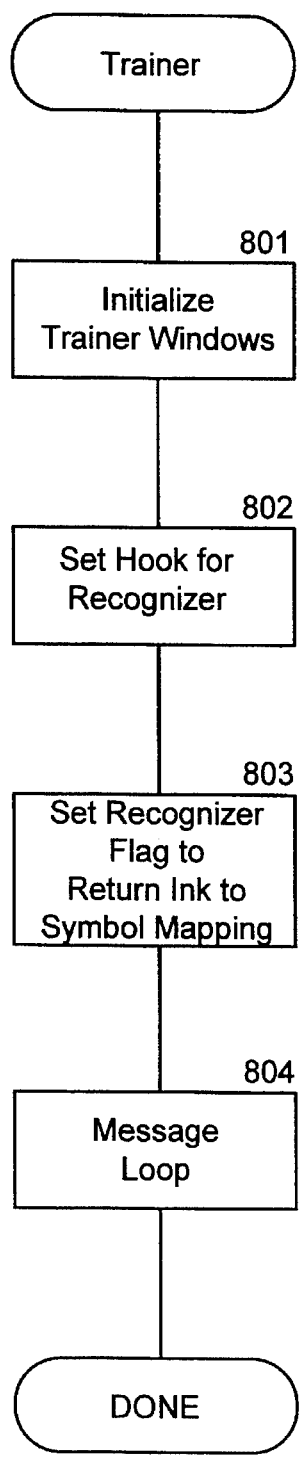
FIG. 8 is a flow diagram of the main procedure for the trainer.

FIGS. 8 through 13 are flow diagrams for the trainer and the recognizer hook. FIG. 8 is a flow diagram of the main procedure for the trainer. The procedure performs initialization and enters a standard Windows message loop. In block 801, the procedure initializes data for the trainer windows. This initialization includes registering window classes and creating instances of the windows. In block 802, the procedure installs the recognizer hook (described below). In block 803, the procedure indicates to the RC manager that it should return a recognized symbol to handwritten data mapping, as shown in FIG. 6. For performance reasons, the recognizer only creates a mapping when the trainer is operating. In block 804, the procedure enters a standard Windows message loop.

Figure 9:
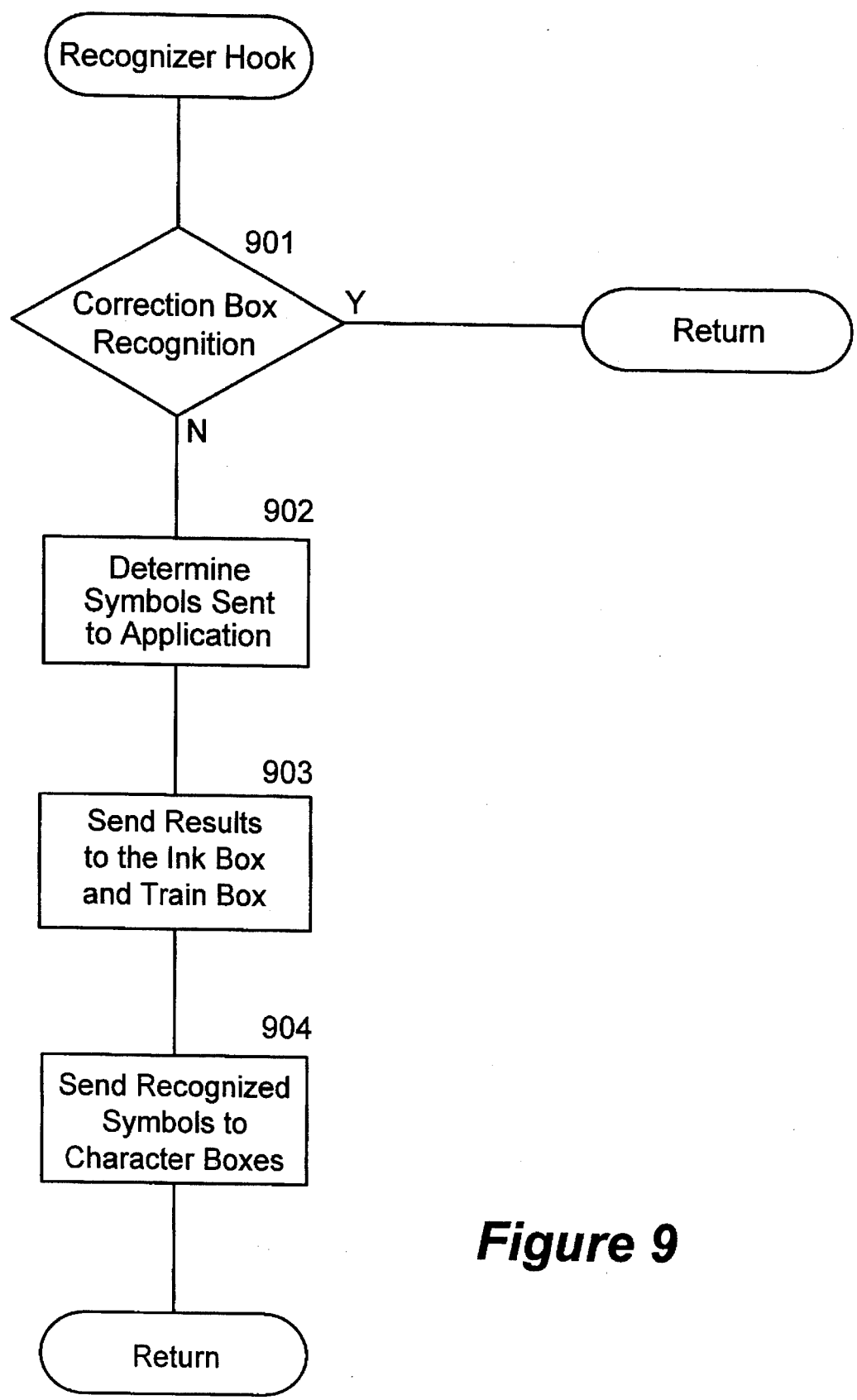
FIG. 9 is a flow diagram of the recognizer hook function.

FIG. 9 is a flow diagram of the recognizer hook function. The recognizer hook receives the recognized symbol to handwritten data mapping (as shown in FIG. 6) each time the recognizer is invoked, and sends the mapping to the trainer, except for recognition that occurs as a result of handwriting in the correction box of the trainer window. In block 901, if the function is invoked as a result of recognition of handwritten data in the correction box of the trainer window, then the hook ignores the mapping and returns, else the function continues at block 902. In block 902, the function determines which symbols were returned to the application by the RC manager, that is, the path of the symbol graph returned. For example, the RC manager may return the symbols "clear" to the application for the symbol graph "{clld}ear." In block 903, the function sends the mapping and the symbols returned to the ink box window and the train box window. In a preferred embodiment, the trainer can maintain a circular list of pointers to previous mappings and symbols. This allows the user to select other than the most recently recognized data for training. In block 904, the function sends the symbols returned to the character boxes window. The function then returns.

Figure 10A:
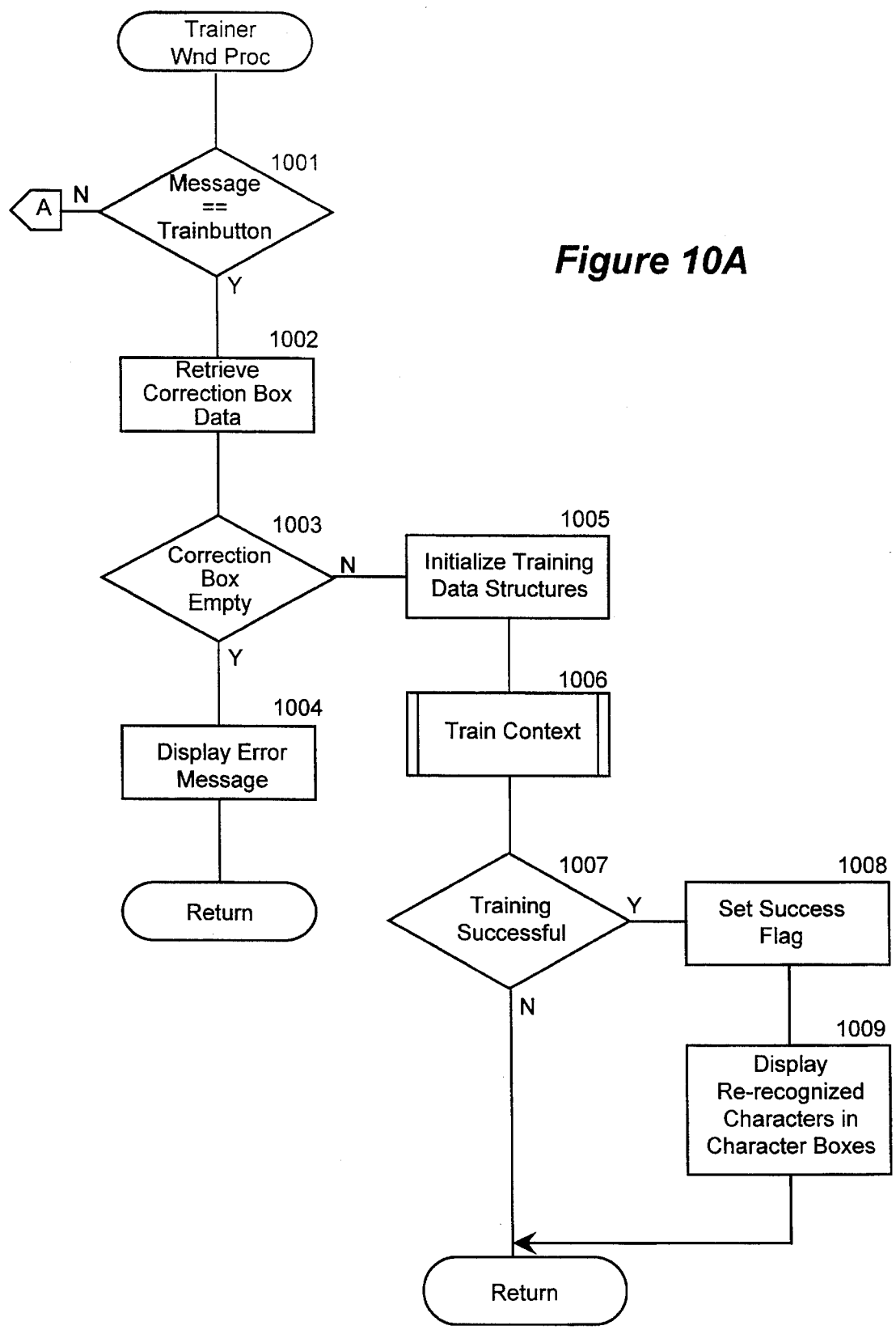
FIG. 10A and 10B are flow diagrams of the main window procedure for the trainer.
Figure 10B:
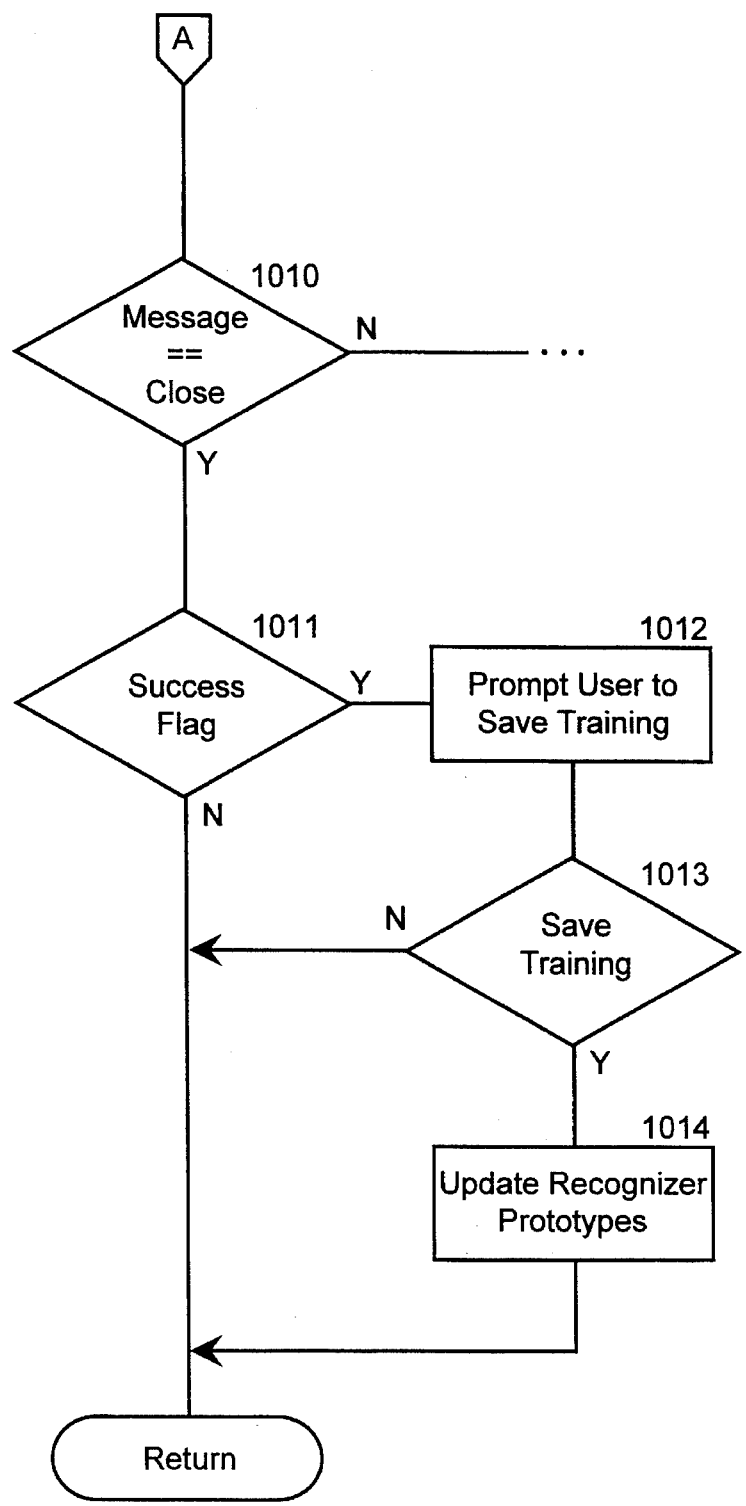

FIGS. 10A and 10B are flow diagram of the main window procedure for the trainer. The trainer window procedure processes the train button and the close button messages. In blocks 1001 through 1009, the procedure processes the train button. The procedure ensures that the correction box is not empty, invokes function TrainContext, and re-recognizes the handwritten data after training. In block 1001, if the message indicates that the train button was selected, then the procedure continues at block 1002, else the procedure continues at block 1010. In block 1002, the procedure retrieves the data from the correction box. In block 1003, if the correction box is empty, then no training can be done and the procedure displays an error message in block 1004 and returns, else the procedure continues at block 1005. In block 1005, the procedure initializes data structures for training (described below). In block 1006, the procedure invokes the function TrainContext to train the recognizer. In block 1007, if the training is not successful, then the procedure returns, else the procedure continues at block 1008. In block 1008, the procedure sets the success flag. The success flag is used to prompt the user whether to actually save the new prototypes as part of the recognizer. In block 1009, the procedure re-recognizes the handwritten data and sends the re-recognized symbols to the character boxes window and then returns. In the block 1010, if the message indicates the close button was selected, then the procedure continues at block 1011, else the procedure continues with normal message processing as indicated by the ellipsis. In block 1011, if the success flag is set, then the user may want to update the prototypes and the procedure continues at block 1012, else the procedure returns. In block 1012, the procedure prompts the user whether to update the prototypes based on the training. In block 1013, if the user wants to save the training, then the procedure in block 1014 directs the recognizer to update its prototypes based on the training. The procedure then returns.

Figure 11:
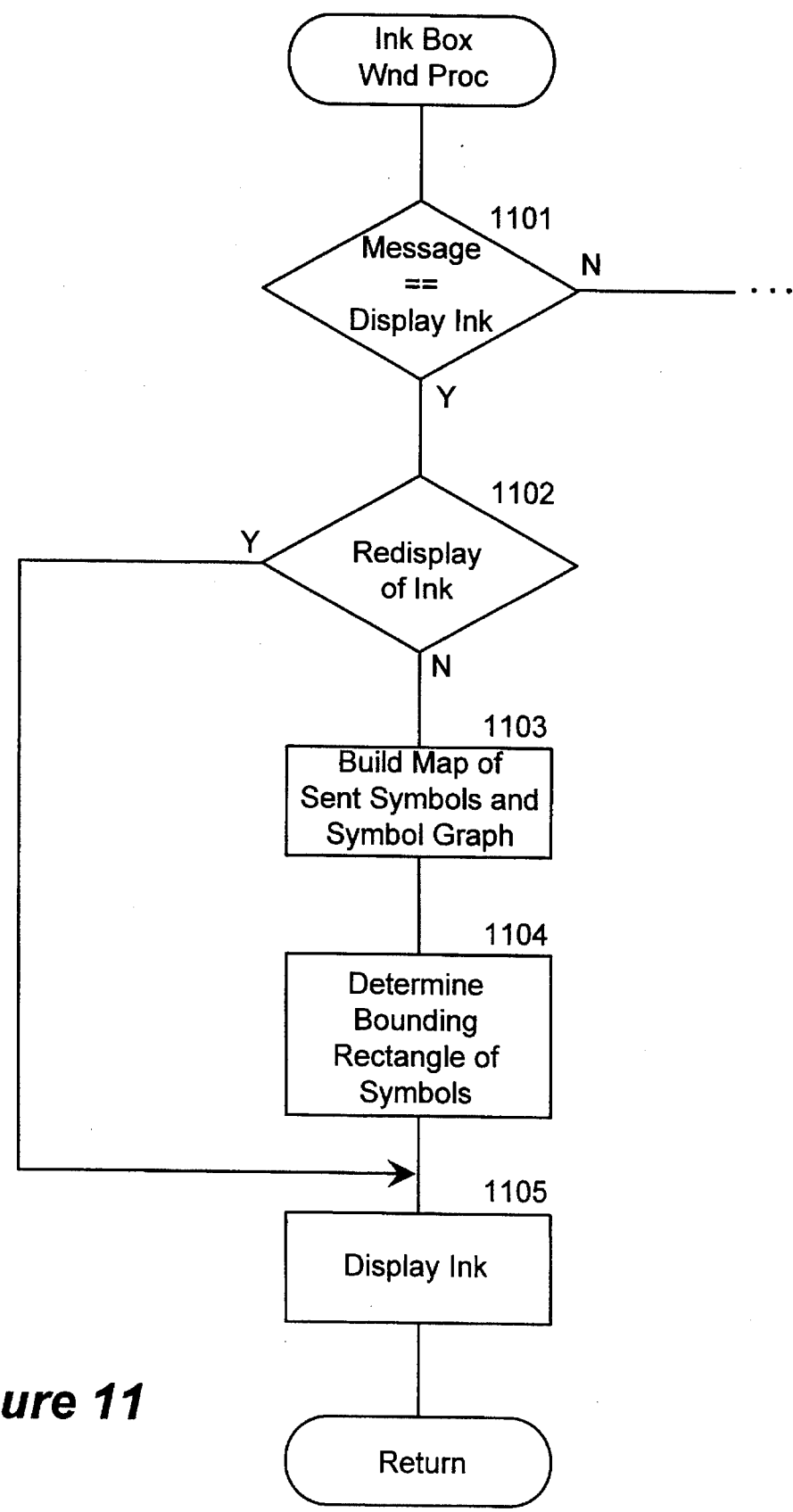
FIG. 11 is a flow diagram of the ink box window procedure.

FIG. 11 is a flow diagram of the ink box window procedure. This procedure controls the display of the handwritten data in the ink box. In block 1101, if the message indicates to display ink, then the procedure continues at block 1102, else the procedure continues with normal message processing as indicated by the ellipsis. In block 1102, if the ink has already been displayed in this window, then the procedure continues at block 1105, else the procedure needs to initialize data structures for display and continues at block 1103. In block 1103, the procedure builds a symbol to handwritten data mapping of the symbols returned to the application. In block 1104, the procedure determines a bounding rectangle for the handwritten data. The upper-left corner of the bounding rectangle is mapped to the upper-left corner of the ink box. The bounding rectangle is delimited by the uppermost, lowermost, right-most, and left-most points of the handwritten data to be displayed. In block 1105, the procedure displays the handwritten data and returns. The handwritten data represents the actual raw handwritten data input by the user.

Figure 12:
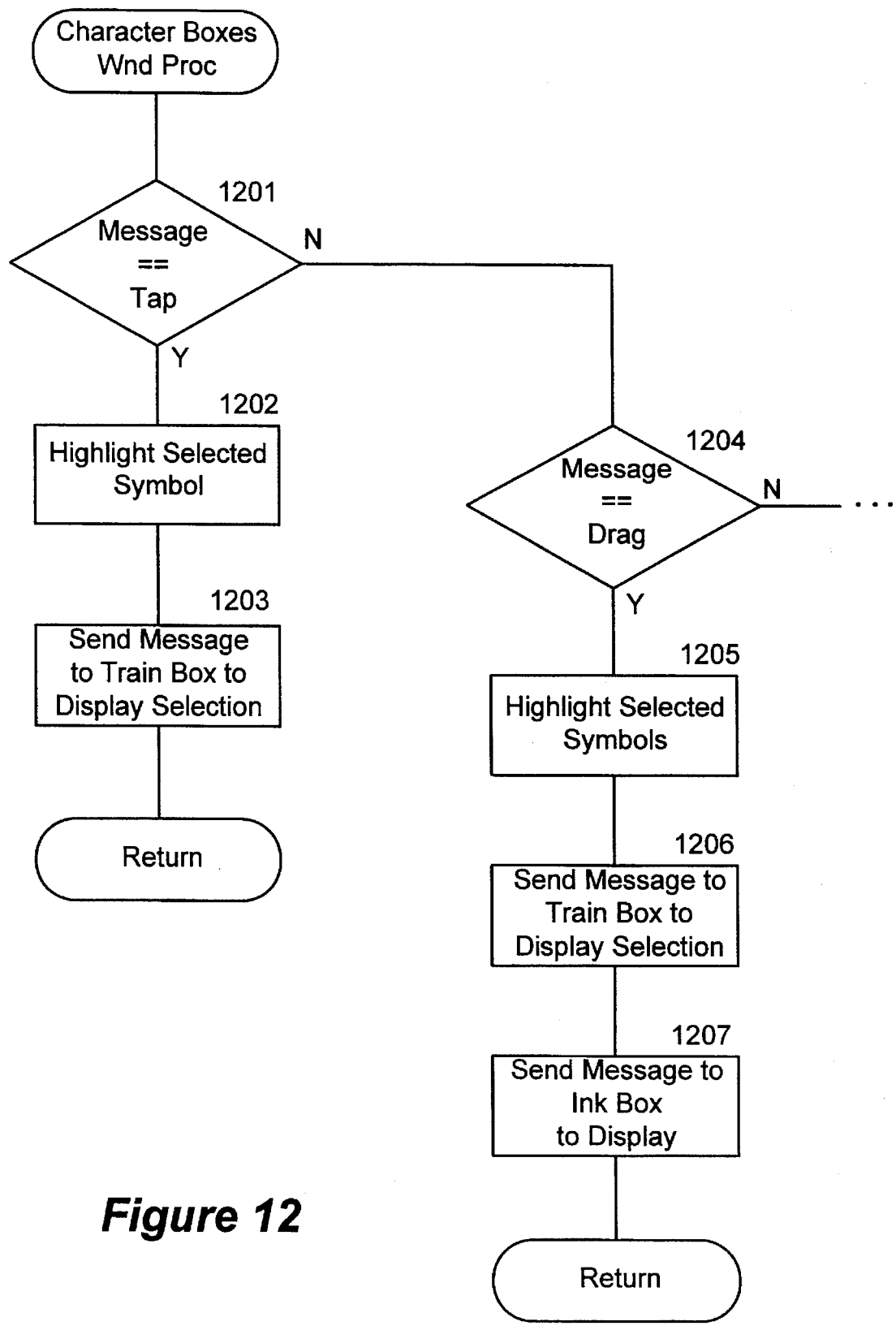
FIG. 12 is a flow diagram of the window procedure for the character boxes.

FIG. 12 is a flow diagram of the window procedure for the character boxes. The procedure controls the selection and scrolling of the symbols. In block 1201, if the message indicates that the user tapped (pen down and pen up) on a character box, then the procedure continues at block 1202, else the procedure continues at block 1204. In block 1202, the procedure highlights the selected (tapped on) box. In block 1203, the procedure sends a message to the train box to display the handwritten data corresponding to the selected symbol and the procedure returns. In block 1204, if the message indicates that the user dragged the pen across character boxes, then the procedure continues at block 1205, else the procedure continues with normal message processing as shown by the ellipsis. In block 1205, the procedure highlights the symbols dragged across and controls the scrolling of the character boxes. In block 1206, the procedure sends a message to the train box window to display the handwritten data corresponding to the selected symbols. In block 1207, the procedure sends a message to the ink box window to display the handwritten data corresponding to the symbols visible in the character boxes and then the procedure returns. The procedure processes the scroll arrows for the character boxes in a similar manner, that is, a message is sent to the ink box window to effect scrolling in tandem.

Figure 13:
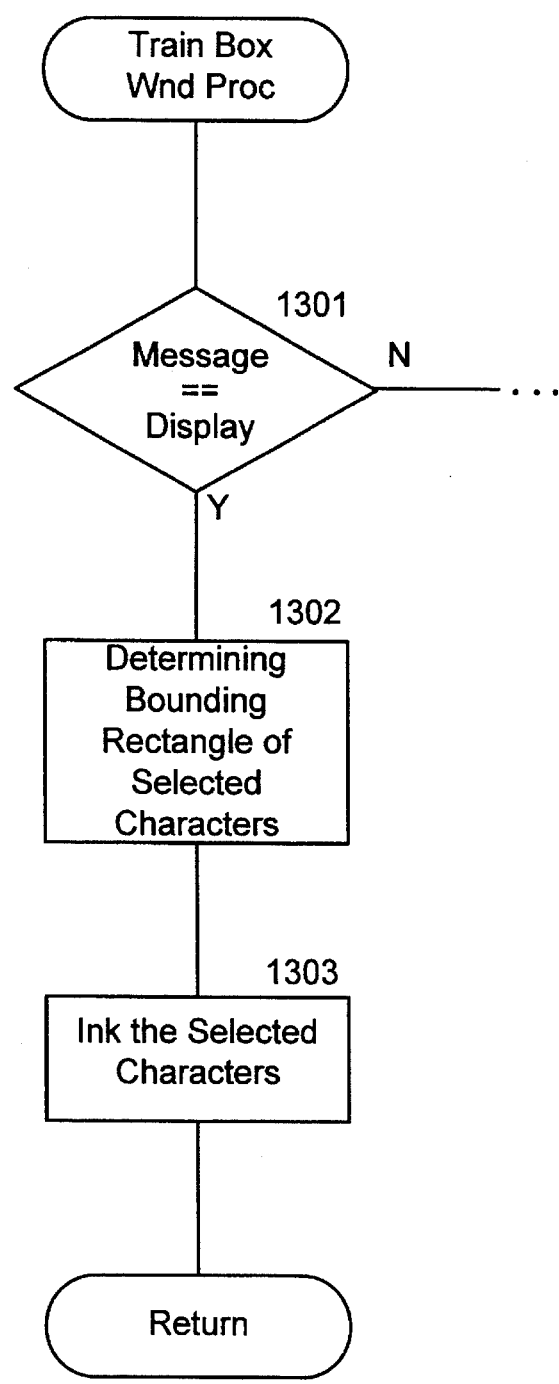
FIG. 13 is a flow diagram of the window procedure for the train box.

FIG. 13 is a flow diagram of the window procedure for the train box. This procedure displays the handwritten data in the train box that corresponds to the selected symbols. In block 1301, if the message is to display handwritten data, then the procedure continues at block 1302, else the procedure continues with normal message processing as shown by the ellipsis. In block 1302, the procedure determines the bounding rectangle for the handwritten data to be displayed. The bounding rectangle is delimited by the uppermost, lowermost, rightmost, and left-most points of the handwritten data to be displayed. In block 1303, the procedure maps the upper-left corner of the bounding rectangle with the upper-left corner of the train window and displays the handwritten data. The procedure then returns.

The function TrainContext provides a recognizer independent training interface. In a preferred embodiment, the recognizer supplies this function. The trainer calls this function passing as parameters the symbol graph data structure containing the symbol to raw handwritten data mapping as shown in FIG. 6, an element table containing the symbols from the correction box, and and element to stroke table that delimits the handwritten data in the train box. The index iSyc of the element table may be set to null to indicate the trainer does not know how to map the new symbols to strokes. However, the index iSyc may point to entries in the passed element to stroke table to indicate suggested segmentation boundaries, that is, the strokes that delimit the symbols in the correction box, to the recognizer. For example, if a user writes "lc," which is recognized as "k" then the trainer could call function TrainContext, with an element to stroke table that points to the handwritten data of the "lc" and two entries, "l" and "c" in the element table. These two entries would point to the same index into a stroke to element table, indicating that both use the handwritten data that was interpreted as "k." Segmentation errors can be corrected in the other direction as well. For example, if the user writes "k," which is recognized as "lc" then the trainer could call function TrainContext with a single entry "k" in the element table. The stroke to element table would contain an entry corresponding to the handwritten data that the recognizer interpreted as "lc."

Although the present invention has been described in terms of preferred embodiments, it is not intended that the invention be limited to these embodiments. Modifications within the spirit of the invention will be apparent to those skilled in the art. The scope of the present invention is defined by the claims that follow.

We claim:

1. A method in a computer system for correcting misrecognition by a handwriting recognizer, the method comprising the computer-implemented steps of:

inputting raw handwritten data;

recognizing the raw handwritten data as a plurality of symbols;

sending the raw handwritten data and the recognized symbols to a trainer; and under control of the trainer, displaying the raw handwritten data and the recognized symbols;

selecting recognized symbols that are misrecognized;

re-displaying the raw handwritten data corresponding to the selected symbols;

inputting correct symbols corresponding to the re-displayed raw handwritten data; and training the handwriting recognizer to recognize the raw handwritten data corresponding to the selected symbols as the correct symbols.

2. A method in a computer system for collecting data for use in training a handwriting recognizer, the handwriting recognizer having a recognition process by which it recognizes handwritten data as symbols, the handwriting recognizer having a training process by which it receives handwritten data and symbols and adjusts its recognition process based on the received handwritten data and the received symbols, the method comprising the computer-implemented steps of:

collecting handwritten data on a computer handwriting input device;

displaying the collected handwritten data on a computer output device;

displaying recognized symbols that correspond to the collected handwritten data on the computer output device;

selecting a portion of the displayed handwritten data that corresponds to recognized symbols that are misrecognized; and inputting at least one correct symbol that the selected portion of the displayed handwritten data should be recognized as by the handwriting recognizer for use in adjusting the recognition process of the handwriting recognizer based on the selected portion of the displayed handwritten data and the input correct symbol.

3. The method of claim 2 including the steps of:

sending the selected portion of the displayed handwritten data and the input correct symbol to the handwriting recognizer for training; and adjusting the recognition process based on the sent handwritten data and the sent correct symbol.

4. The method of claim 2 or 3 including the step of highlighting the selected portion of the displayed handwritten data.

5. The method of claim 2 or 3 including the step of re-displaying the selected portion of the displayed handwritten data out of context from non-selected portions of the displayed handwritten data.

6. The method of claim 2 or 3 wherein the input correct symbol is a gesture.

7. The method of claim 2 or 3 including the step of recognizing the collected handwritten data as at least one equivalent symbol, wherein a portion of the collected handwritten data is not recognized and wherein a symbol of nonrecognition is generated as the equivalent symbol.

8. The method of claim 2 or 3 wherein the step of selecting a portion of the displayed handwritten data includes the steps of:

recognizing the collected handwritten data as at least one symbol;

displaying the recognized symbol on a computer output device;

creating a mapping between each displayed recognized symbol and corresponding displayed handwritten data;

selecting the displayed recognized symbol that corresponds to a portion of the displayed handwritten data to be selected; and using the corresponding displayed handwritten data that maps from the selected displayed recognized symbol as the selected portion of the displayed handwritten data.

9. The method of claim 3 including the step of re-recognizing the collected handwritten data after adjusting the recognition process.

10. A computer system for training a handwriting recognizer to correctly recognize handwritten data that was previously misrecognized, the computer system comprising:

a handwriting recognizer for receiving handwritten data and recognizing the handwritten data as symbols;

a recognizer hook for storing the handwritten data and the recognized symbols; and a trainer comprising:

means for displaying the stored handwritten data and the recognized equivalent symbols;

means for selecting a portion of the displayed handwritten data that corresponds to recognized symbols that are misrecognized;

means for inputting a correct symbol that the selected portion of the displayed handwritten data should be recognized as; and means for training the handwriting recognizer to recognize the selected portion of the handwritten data as the input correct symbol.

11. The system of claim 10 wherein the means for selecting a portion of the displayed handwritten data selects a recognized symbol and selects the handwritten data corresponding to the selected recognized symbol as the selected portion of the displayed handwritten data.

12. The system of claim 10 wherein the means for selecting a portion of the displayed handwritten data includes means for identifying handwritten data that is displayed by the display means and selecting a portion of the handwritten data that includes the identified handwritten data such that the selected portion of the displayed handwritten data corresponds to integral recognized symbols.

13. The system of claim 10 including means for highlighting the selected portion of the displayed handwritten data.

14. The system of claim 10 including means for re-displaying displaying the selected portion of the displayed handwritten data out of context from non-selected portions of the displayed handwritten data.

15. The system of claim 10 wherein the means for inputting a correct symbol inputs a gesture.

16. A method in a computer system of inputting data for the training of a handwriting recognizer, the method comprising the computer-implemented steps of:

receiving handwritten data;

receiving recognized symbols that correspond to the handwritten data;

receiving a mapping from the recognized symbols to the handwritten data;

selecting a recognized symbol that is misrecognized;

displaying a portion of the handwritten data that corresponds to the selected symbol; and inputting a correct symbol that the displayed portion of the handwritten data is to be recognized as by the handwriting recognizer for use in training the handwriting recognizer to recognize the displayed portion of the handwritten data as the input correct symbol.

17. The method of claim 16 wherein the input symbol is a gesture.

18. The method of claim 16 wherein the displayed portion of the handwritten data is displayed out of context from other handwritten data.

19. The method of claim 16 including the step of displaying the received handwritten data.

20. The method of claim 16 including the step of displaying the received recognized symbols that correspond to the handwritten data.

21. A method in a computer system for correcting misrecognition by a handwriting recognizer, the computer system including a memory and a display device, the memory having a database of prototypes with handwritten data and corresponding symbols, the method comprising the computer-implemented steps of:

inputting raw handwritten data;

recognizing the raw handwritten data as a plurality of symbols;

sending the raw handwritten data and the recognized symbols to a trainer; and under control of the trainer,
displaying the raw handwritten data and the recognized symbols on the display device;
selecting recognized symbols that are misrecognized;
re-displaying the raw handwritten data corresponding to the selected symbols on the display device;
inputting correct symbols corresponding to the re-displayed handwritten data;
training the handwriting recognizer to recognize the raw handwritten data corresponding to the selected symbols as the correct symbols; and
updating the prototypes in the memory using the raw handwritten data and the corresponding correct symbols.

* * * * *

UNITED STATES PATENT AND TRADEMARK OFFICE
CERTIFICATE OF CORRECTION

PATENT NO.    : 5,550,930
DATED         : August 27, 1996
INVENTOR(S)   : Eric R. Berman et al.

It is certified that error appears in the above identified patent and that said Letters Patent is hereby corrected as shown below:

On the title page item[75] before "all of Wash."
please add --Shishir P. Pardikar, Redmond,--.

Signed and Sealed this

Thirty-first Day of December, 1996

Attest:

BRUCE LEHMAN

*Attesting Officer*    *Commissioner of Patents and Trademarks*